United States Patent Office 3,108,920
Patented Oct. 29, 1963

3,108,920
AQUEOUS SOLUTION OF A POLYMER OF VINYL ALKOXY SILANE, MALEIC ANHYDRIDE AND VINYL ESTER OF A FATTY ACID AND PROCESS FOR PROTECTING GLASS THEREWITH
Paul Lagally, State College, Pa., assignor to Brockway Glass Company, Inc., Brockway, Pa.
No Drawing. Filed Sept. 29, 1961, Ser. No. 143,997
12 Claims. (Cl. 156—310)

This invention relates to the preparation of a new group of surface active compounds designed for the external treatment of pristine glass containers and a method of treatment of glass containers therewith. More particularly this invention relates to a unique composition which when applied to pristine glass surfaces not only protects them from mechanical damage, but imparts thereto a high degree of water repellency without impairing labeling characteristics.

It is well known that a pristine glass surface is very sensitive to damage and even slight scratches which may result from handling considerably lower its strength. In order to protect and lubricate such surfaces it has been a common expedient in the bottle manufacturing arts to apply certain compounds of the silicone type thereto thus giving the surface the desired degree of lubricity in both the wet and dry state to allow their handling through various conditions such as conveyor lines and pasteurizers without surface damage. The silicone compositions available for this purpose at present such as Dow Corning Z-4141 or E.F. 4010 are quite satisfactory for these desired results; however, they do impart to the glass surface a high degree of water repellency with consequent impairment of the labeling characteristics particularly if hydrophilic glues such as dextrin or alkali jelly gum are used for such labeling. Further, it has been found that such silicone compositions are sensitive to carbon dioxide and have limited shelf life; since they are supplied in organic solution they are objectionable because they contaminate the air when sprayed onto the surface of the glass containers.

The instant invention provides a solution to the above cited problems by providing new compositions which are solid materials soluble in aqueous media. The compositions are derived from organic-inorganic elastomers and more particularly from elastomeric substances obtained by the co-polymerization of maleic anhydride, vinyl stearate and a vinyl alkoxy silane with or without vinyl formate. These compositions have all the advantages of the normally applied silicone polymers described above along with an unlimited shelf life and excellent adhesion to water base glues such as those used in standard labeling. The composition is easily applied to the glass surface by conventional spray techniques and, after application, may be subjected to dry steam treatment to provide a further modification of the co-polymer to obtain even further improvements in the desired characteristics.

The instant invention is based in part on the discovery that polyvinyl alcohol is particularly suitable for promoting the adhesion of water base glues. Thus the composition of this invention provides as one of the basic components alcoholic hydroxy groups obtained by hydrolysis of formate groups, in an arrangement similar to that present in polyvinyl alcohol, for the adhesion of water base glues; and, in addition, silicon ester or silanol groups for surface protection; and acyl groups derived from long chain aliphatic acids for lubricity. The composition also provides, in addition, carboxy groups required for solubility in aqueous media.

The synthesis and use of the compounds of this invention involves the following steps: (1) The preparation of an elastomeric macromolecular compound using maleic anhydride, a vinyl silicon ester and at least one vinyl ester derived from fatty aliphatic acids, preferably vinyl stearate and vinyl formate, employing free radical polymerization techniques and using a common water-miscible solvent; (2) the removal of the organic solvent by an exhaustive washing operation with cold water and subsequent drying of the reaction product at elevated temperatures whereby the silicon ester groups are almost completely replaced by silanol groups and the latter are partly transformed into siloxane groups; (3) dissolving the organic siloxane co-polymer in boiling water containing an aqueous base such as ammonia or dilute caustic whereby the anhydride rings are opened to form pairs of carboxy groups; (4) spraying the aqueous solution of the hydrolyzed elastomeric compound onto the surface of the glass containers, whereby its residual silanol groups react with the silanol groups located in the glass surface; (5) submitting the treated glass container to superheated or pressurized steam, whereby the siloxane groups in the surface coating are transformed into silanol groups which then react with silanol groups in the glass surface.

The composition thus provided adheres strongly to the glass surface while providing sufficient groups of the polyvinyl alcohol type to allow easy adherence of water base label adhesives and glues. The labels utilized are applied by common expedients in the art such as labeling machinery or manual application.

The above cited steps may be more fully explained as follows, although this explanation in theoretical and other actions and interactions of the base components may also occur during these basic reactions. Thus we do not desire to be bound by any theory of reaction and merely present the following as a guide and explanation of the basic reaction mechanisms.

(1) The first step is designed to co-polymerize the preferred components, namely, maleic anhydride, vinyl trialkoxy silane, vinyl formate and vinyl stearate. Since the maleic anhydride is immiscible with the vinyl esters, e.g., vinyl stearate, a common solvent must be used in order to produce a homogeneous reaction mixture required for complete polymerization. This solvent must have a boiling point high enough to permit the catalyst used to form free radicals and it must not contain active hydrogen which would transform the maleic anhydride prematurely, before polymerization, into an ester or amide type derivative. It also must be water-miscible in order to be removed by a subsequent washing operation with water.

Suitable solvents include water-miscible ethers such as tetra-hydrofuran, dioxane or ethyleneglycol dimethyl ether or its homologs but other solvents can be used as well, dependent on the polymerization catalyst. For the polymerization, the catalyst may be of the azo type, for instance, alpha,alpha'-azo-di-isobutyronitril, or of the peroxygen type, for instance, di-benzoylperoxide. Other catalysts which may be used include lauroyl peroxide, acetyl peroxide, acetyl benzoyl peroxide, di-tert.-butyl peroxide, tetralin peroxide and similar well known organic peroxides. Alpha,alpha'-azo-di-isobutyronitril and dibenzoyl peroxide are the preferred catalysts.

The reaction is carried out on a steam bath and the products of this free radical polymerization consisting of macromolecular chains containing randomly distributed maleic anhydride, vinyl trialkoxy silane, vinyl formate and vinyl stearate are substantially insoluble in cold water.

This insolubility makes it possible to remove the water miscible organic solvent whereby the alkoxy silicon groups are transformed into silanol groups which may undergo subsequent reaction, to some degree, forming siloxane groups. This solvent removal and its resultant effect upon the composition constitute step 2.

(2) The second step consists of a water wash to remove all soluble by-products including unreacted maleic anhydride, any maleic acid formed, and the compounds produced during catalyst breakdown, e.g. benzoic acid resulting from the use of benzoyl peroxide as the polymerization catalyst. After complete washing with cold water, the resultant polymeric mass may be dried to a powder and in so proceeding the hydrolysis of the alkoxy silane groups is practically complete with resultant partial conversion to siloxanes. The dried polymeric materials contain the cyclic anhydride groups practically unchanged as determined by infra red spectroscopy.

(3) The third step provides an activation of the compounds of this invention and consists of reacting the polymeric powder formed in step 2 with boiling water containing small amounts of a base whereby the anhydride rings are opened to form recurring dicarboxy acid groups and the formate groups, if present, are hydrolyzed leaving the other fatty acid ester groups, e.g. stearates, substantially unaffected. The resultant material therefore contains macromolecular compounds with both alcoholic and ester groups as well as the carboxy, silanol and siloxane groups. The product of this step has the desired properties of polyvinyl alcohol for water base adhesive affinity. It could not be produced by known methods wherein a polyvinyl ester such as polyvinyl acetate is converted to polyvinyl alcohol by a reaction with absolute alcohol because this latter reaction requires substantial quantities of mineral acids or caustic alkalies and consequently could not be carried out in the presence of silanol groups without the formation of water insoluble gels which would be useless for the intended purpose.

(4) The fourth step of the instant process consists of spraying the aqueous solution formed in step 3 containing both silanol and siloxane groups, in a conventional manner, on the pristine surface of a glass container whereby the silanol groups react with the silanol groups of the glass surface and thereby hold the surface coating in place during subsequent operations such as washing, filling, and pasteurizing of the treated containers.

(5) One further step may be and preferably should be applied to the coated surfaces. This step comprises a steaming operation whereby portions of the siloxane groups present in the coating are believed to be transformed into silanol groups which can react with residual silanol groups in the glass surfaces.

The glass surfaces are now in condition for label attachment with the alcoholic hydroxy groups presenting a hydrophilic area for attachment to the water base adhesives such as those comprising dextrine.

Where the water base glue does not contain dextrine, e.g. casein and alkali jelly gum it is not necessary to include the vinyl formate since this type of coating material sufficiently bonds with the glues.

The composition of the compounds of this invention may be varied within broad limits. The vinyl alkoxy silane may be vinyl triethoxy, triisopropoxy, trimethoxy, tributoxy, etc. silanes while the vinyl stearate may be partly replaced by vinyl acetate, vinyl propionate or vinyl octanoate, etc. The lubricating function derived from the stearate may also be provided by other fatty acid esters such as the palmitates, oleates, etc.

The hydrolysis of the polymerization products of this invention can be carried out with caustic alkalies such as NaOH, KOH, LiOH, with carbonates such as $NaHCO_3$ or $Na_2CO_3$, or with ammonia or various organic bases such as ethanolamine or ethylene diamine except the polymerized amines such as polyethylene imine which form insoluble precipitates.

The concentration of the spray solution should be between 0.05% and 1.0% depending upon the technique of application, the pH of the spray solution can vary within broad limits in the acid and neutral range (pN 4–7) but weakly acidic reaction medium in the order of pH-6 is preferred. The preferred temperature of the glass containers to be treated is between 120° F. and 150° F. to promote rapid drying and the time for the steam curing should be between 5 seconds and 15 minutes.

The proportions of the ingredients for this polymer composition may be varied within the following limits, to obtain the desired results: maleic anhydride (or its equivalent) 25–50%; vinyl fatty acid ester 25–60%; and vinyl trialkoxy silane 15–40%. A co-polymer containing 35.5% maleic anhydride, 16.1% vinyl stearate, 18.7% vinyl formate, and 29.6% vinyl triethoxy silane was found to give most satisfactory results with excellent labeling characteristics with most commercial water-base glues including casein, dextrin and alkali jelly gum.

Having generically described the instant invention, the following shows specific examples of the instant polymer compositions and how the process is performed:

(1) A coating material which is designed to preserve the pristine strength of glass containers and to have good adhesion properties with casein glue as required for beer bottles is prepared as follows: 30.7 grams maleic anhydride, 29.1 grams vinyl stearate and 17.8 grams vinyl triethoxy silane are mixed with 75 mls. ethylene glycol dimethyl ether, 1.5 grams dibenzoyl peroxide are added and the mixture is heated on a steam bath to a temperature of 80° C. until the heat of polymerization supports further reaction. The reaction mixture is kept close to and just below the boiling temperature for 2 hours; it is then poured slowly into a large excess of vigorously stirred cold water whereby the hydrolyzed polymerization product is separated in the form of a fine powder. The latter is washed until free from acidic and organic residues and it is then dried at a temperature of 65° C. The yield is practically quantitative.

One part of this material is added to 100 parts of almost boiling water (98° C.) and dilute ammonia is added to bring the pH to approximately 6. The obtained solution, which is clear, is sprayed on glass containers having a surface temperature of 50° C. at a rate of $5 \times 10^{-6}$ ozs. per square inch surface area.

The glass containers thus treated are highly lubricated as measured by the sliding table and they are moderately hydrophobic. In the dry state, they slide at 10° incline; in the wet state, they slide at 15° incline. Their surface strength, as measured by hydrostatic pressure testing, is substantially the same as that for the pristine bottles. And they show good adhesion to casein and alkali jelly gum glues.

The surface protection of these bottles was further improved by submitting them to a treatment with steam. After steaming (40 lb. per square inch) for 5 seconds the surface strength is relatively unaffected by normal abuse.

(2) A coating material which shows good adhesion to casein, dextrin, and alkali jelly gum and which substantially preserves the strength of the treated glass containers, is prepared as follows:

21.4 grams maleic anhydride, 9.7 grams vinyl stearate, 11.2 grams vinyl formate and 17.8 grams vinyl triethoxy silane are mixed with 60 mls. ethylene glycol dimethyl ether and the mixture is polymerized with 1.2 grams benzoyl peroxide as initiator as described in Example 1. The polymerization product is washed with cold water and, after drying, it is dissolved in 100 parts boiling water containing dilute sodium hydroxide in an amount to give a pH of 6. This solution is diluted to a stock concentration of 0.1% and glass containers sprayed are subsequently treated with pressurized steam. The surface of these containers is well protected and was effectively labelled with casein, dextrin, or alkali jelly gum glues.

The composition of this invention has been described largely in terms of its preferred embodiment, namely its application to pristine glass surfaces, however it is to be recognized that this composition may be applied to other materials such as paper, cloth and organic resins to increase their adhesion to water base glues.

Similarly it will be apparent to those skilled in the

I claim:

1. A process for protecting pristine glass surfaces while rendering said surfaces compatible with water base adhesives, comprising applying to said surface an aqueous solution of base treated polymer of vinyl alkoxy silane, maleic anhydride and vinyl fatty acid ester.

2. The process according to claim 1 wherein the polymer also contains polymerized vinyl formate units.

3. A process according to claim 1 wherein, after applying the polymer to the pristine glass surface, it is steam treated.

4. A process for protecting pristine glass surfaces while rendering said surface compatible with water base adhesives comprising applying to said surface a polymeric product obtained by (1) polymerizing a vinyl alkoxy silane, maleic anhydride, and a vinyl fatty acid ester in a water miscible common solvent, (2) washing the product of polymerization with cold water and drying at an elevated temperature, and (3) dissolving the dried product in a dilute aqueous base.

5. A process according to claim 4 wherein the polymeric product is applied to the surface by spraying.

6. A process according to claim 5 which further comprises the step of steam treating the glass surface after the polymeric material is applied.

7. A process according to claim 6 wherein after steam treatment a label is applied by water base adhesives.

8. A composition for protecting surfaces while rendering said surfaces compatible with water base adhesives consisting essentially of an aqueous solution of the neutralized polymer of vinyl alkoxy silane, maleic anhydride and a vinyl fatty acid ester.

9. The composition of claim 8 wherein the polymer also includes polymerized vinyl formate units.

10. A composition according to claim 8 in which ammonia is included as the neutralizing agent.

11. A composition according to claim 8 in which sodium hydroxide is included as the neutralizing agent.

12. A glass container having a surface compatible with water base adhesives, comprising a pristine glass base coated with a neutralized polymer of vinyl alkoxy silane, maleic anhydride, and a vinyl fatty acid ester.

References Cited in the file of this patent

UNITED STATES PATENTS

| | | |
|---|---|---|
| 2,512,390 | Sommer | June 20, 1950 |
| 2,827,440 | Arrandale et al. | Mar. 18, 1958 |
| 2,864,808 | Harris | Dec. 16, 1958 |
| 2,945,003 | Olson et al. | July 15, 1960 |
| 3,046,243 | Santelli et al. | July 24, 1962 |